United States Patent [19]

Kurokami

[11] Patent Number: 5,432,522
[45] Date of Patent: Jul. 11, 1995

[54] CROSS POLARIZATION INTERFERENCE COMPENSATING DEVICE COMPRISING DECISION FEEDBACK CROSS POLARIZATION INTERFERENCE CANCELLERS

[75] Inventor: Yuzo Kurokami, Tokyo, Japan

[73] Assignee: NEC Corporation, Tokyo, Japan

[21] Appl. No.: 358,602

[22] Filed: Dec. 14, 1994

Related U.S. Application Data

[63] Continuation of Ser. No. 11,737, Feb. 1, 1993, abandoned.

[30] Foreign Application Priority Data

Jan. 31, 1992 [JP] Japan .................... 4-17009

[51] Int. Cl.6 .................. H01Q 21/06; H04B 1/10
[52] U.S. Cl. .................... 342/361; 342/362; 455/295
[58] Field of Search ............... 342/361, 362; 455/295, 455/296

[56] References Cited

U.S. PATENT DOCUMENTS

| | | | |
|---|---|---|---|
| 4,577,330 | 3/1986 | Kavehrad | 455/295 |
| 4,631,734 | 12/1986 | Foschini | 455/295 |
| 4,644,562 | 2/1987 | Kavehrad et al. | 455/295 |
| 5,075,697 | 12/1991 | Koizumi et al. | 342/361 |

OTHER PUBLICATIONS

Onde Electrique, vol. 66, No. 3, May 1986, Paris, FR, pp. 82–91, Borgne et al., "Resultats de l'etude de compensation d'interference cofrequence".

"Dezitaru Shingó Syori (Digital Signal Processing)" published by the Institute of Electronics and Electric Communication, Chapter, 11, Table 11.2 (p. 241).

J. G. Proakis, "Digital Communications", McGraw-Hill, 1983, pp. 382–386.

H. Ohtuska et al., "The SBS Control Algorithm of Cross Polarization . . . on Digital Radio Systems", The Transactions of the IEICE, vol. E 73, No. 3, Mar. 1990, pp. 401–408.

*Primary Examiner*—Gregory C. Issing
*Attorney, Agent, or Firm*—Sughrue, Mion, Zinn, Macpeak & Seas

[57] ABSTRACT

On receiving a symbol sequence carried by a first-polarization and a second-polarization signal of two orthogonally polarized signals and in order to cancel a cross polarization interference (XPI) component which leaks from the second-polarization signal into the first-polarization signal, a first decision feedback XPI canceller (43) is supplied with a before processed signal derived from the second-polarization signal and with a decided signal which is produced by a decision circuit (22) and which represents the symbol sequence carried by the second-polarization signal with an intersymbol interference component and another XPI component cancelled from the before processed signal. Another decision feedback XPI canceller (44) is similarly operable. Preferably, a first decision feedback equalizer (41) is supplied with another before processed signal derived from the first-polarization signal and with another decided signal which is produced by another decision circuit (21) and which represents the symbol sequence carried by the first-polarized signal with another intersymbol interference component and the first-mentioned XPI component cancelled from the last-mentioned before processed signal. A second decision feedback equalizer (42) is similarly used. Alternatively, a delay element is used instead of each decision feedback equalizer if the intersymbol interference components are negligible.

3 Claims, 5 Drawing Sheets

CROSS POLARIZATION INTERFERENCE COMPENSATING DEVICE COMPRISING DECISION FEEDBACK CROSS POLARIZATION INTERFERENCE CANCELLERS

This is a continuation of application Ser. No. 08/011,737 filed Feb. 1, 1993 now abandoned.

BACKGROUND OF THE INVENTION

This invention relates to a cross polarization interference compensating or cancelling device for use in an orthogonal polarization communication system in which use is made of two orthogonally polarized signals of a common frequency.

Attention is recently directed in microwave radio communication to an orthogonal polarization communication system in which effective use is made of a first-polarization and a second-polarization signal as two orthogonally polarized signals of a common frequency. Into the two orthogonally polarized signals, differently polarized components are inevitably introduced due to heterogeneity which is given to a transmission medium by rain and the like. In other words, each of the two polarization signals are subjected to a cross polarization interference. Consequently, various cross polarization compensating devices are proposed for use in compensating for the interference.

One of such cross polarization compensating devices is described in a paper contributed by Hiroyuki Ohtsuka and two others under the title of "The SBS Control Algorithm of Cross Polarization Interference Canceller on Digital Radio Systems" to the Transactions of the IEICE, Volume E 73, No. 3 (March 1990), pages 401 to 408. In the manner which will later be described more in detail, the cross polarization interference compensating device of Ohtsuka et al comprises a first equalizer for equalizing a first-polarization signal into a first equalized signal devoid of a first intersymbol interference component which is superposed on the first-polarization signal. A second equalizer equalizes a second-polarization signal into a second equalizer output signal exempted from a second intersymbol interference component superposed on the second-polarization signal. Supplied with the second-polarization signal, a first cross polarization interference canceller produces a first canceller output signal related to a first cross polarization interference component which is superposed on the first-polarization signal by the second-polarization signal. Supplied with the first-polarization signal, a second cross polarization interference canceller produces a second canceller output signal concerned with a second cross polarization interference component which is superposed on the second-polarization signal from the first-polarization signal.

A first adder adds the first canceller output signal to the first equalizer output signal to produce a first sum signal in which the first-polarization signal is exempted from the first intersymbol and cross polarization interference components. Similarly, a second adder produces a second sum signal. Supplied with the first sum signal, a first decision circuit produces a first decided signal representative of a symbol sequence carried by the first-polarization signal. Likewise, a second decision circuit produces a second decided signal representative of the symbol sequence carried by the second-polarization signal.

The conventional cross polarization interference compensating device is, however, defective in that the intersymbol and the cross polarization interference components are not reliably removed from the first and the second sum signals when become large. The decision circuits may misjudge the symbol sequence under the circumstances.

SUMMARY OF THE INVENTION

It is consequently a general object of the present invention to provide a cross polarization interference compensating device which can reliably remove cross polarization interference components introduced into two orthogonally polarized signals used in an orthogonal polarization communication system.

It is another general object of this invention to provide a cross polarization interference compensating device which is of the type described and by which a symbol sequence is not misjudged.

It is a specific object of this invention to provide a cross polarization interference compensating device which is of the type described and which can reliably remove intersymbol interference components introduced into the two orthogonally polarized signals.

Other objects of this invention will become clear as the description proceeds.

On setting forth the gist of this invention, it is possible to understand that a cross polarization interference compensating device is for use in an orthogonal polarization communication system in which a first-polarization signal and a second-polarization signal are used as two orthogonally polarized signals of a common frequency and that the cross polarization interference compensating device includes a first sampling and quantizing unit for sampling and quantizing the first-polarization signal into a first digital signal, a second sampling and quantizing unit for sampling and quantizing the second-polarization signal into a second digital signal, a first decision circuit for deciding a first-polarization symbol sequence in a first circuit input signal as a first decided signal, and a second decision circuit for deciding a second-polarization symbol sequence in a second circuit input signal as a second decided signal.

In accordance with an aspect of this invention, the above-understood cross polarization interference compensating device comprises: (A) first and a second forward transversal filters supplied with the first digital signal; (B) third and fourth forward transversal filters supplied with the second digital signal; (C) first and second rearward transversal filters supplied with the first decided signal; (D) third and fourth rearward transversal filters supplied with the second decided signal; (E) a first total adder for summing output signals of the first forward transversal filter, the first rearward transversal filter, the fourth forward transversal filter, and the fourth rearward transversal filter into the first circuit input signal; and (F) a second total adder for summing output signals of the second forward transversal filter, the second rearward transversal filter, the third forward transversal filter, and the third rearward transversal filter into the second circuit input signal.

In accordance with another aspect of this invention, the above-understood cross polarization interference compensating device comprises: (A) a first delay element for giving a first predetermined delay time to the first digital signal to produce a first delayed signal; (B) a second delay element for giving a second predetermined delay time to the second digital signal to produce a second delayed signal; (C) a first transversal filters and second forward transversal filters supplied with the first digital signal; (D) a third and fourth forward transversal filters supplied with the second digital signal; (E) a first rearward transversal filter supplied with the first delayed signal; (F) a second rearward transversal filter supplied with the first decided signal; (G) a third rearward transversal filter supplied with the second delayed signal; (H) a fourth rearward transversal filter supplied with the second decided signal; (I) a first total adder for summing output signals of the first forward transversal filter, the first rearward transversal filter, the fourth forward transversal filter, and the fourth rearward transversal filter into the first circuit input signal; and (J) a second total adder for summing output signals of the second forward transversal filter, the second rearward transversal filter, the third forward transversal filter, and the third rearward transversal filter into the second circuit input signal.

According to a different aspect of this invention, the above-understood cross polarization interference compensating device comprises: (A) a first forward transversal filter supplied with the first digital signal; (B) a second forward transversal filter supplied with the second digital signal; (C) a first rearward transversal filter supplied with the first decided signal; (D) a second rearward transversal filter supplied with the second decided signal; (E) a first delay element supplied with the first digital signal to produce a first delayed signal with a first predetermined delay time; (F) a second delay element supplied with the second digital signal to produce a second delay signal with a second predetermined delay time; (G) a first total adder for summing output signals of the second forward transversal filter, the second rearward transversal filter, and the first delay element into the first circuit input signal; and (H) a second total adder for summing output signals of the first forward transversal filter, the first rearward transversal filter, and the second delay element into the second circuit input signal.

DESCRIPTION OF PREFERRED EMBODIMENTS

Figure 1:
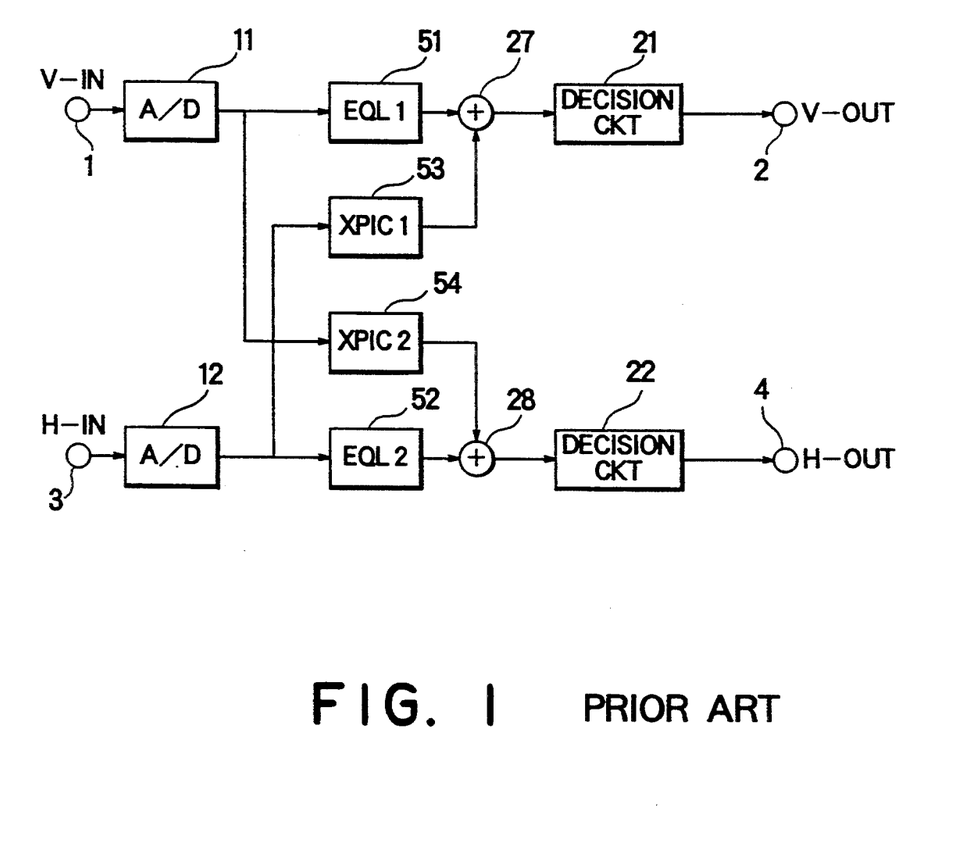
FIG. 1 is a block diagram of a conventional cross polarization interference compensating device.

Referring to FIG. 1, a conventional cross polarization interference compensating or cancelling device will first be described in order to facilitate an understanding of the present invention. The cross polarization interference compensating device is described in the Ohtsuka et al paper referred to hereinabove.

In the manner described heretobefore, such a cross polarization interference compensating device is used in an orthogonal polarization communication system in which use is made of a first-polarization and a second-polarization signal as two orthogonally polarized signals of a common frequency. For reception at the orthogonal polarization communication system, information is represented by a symbol sequence and is caused by the first-polarization and the second-polarization signals as first-polarization and second-polarization symbol sequences.

In the orthogonal polarization communication system, a first demodulator (not shown) demodulates the first-polarization signal into a first analog baseband signal. A second demodulator (not shown) demodulates the second-polarization signal into a second analog baseband signal. Depending on the circumstances, the first and the second analog baseband signals are herein referred to as the first-polarization and the second-polarization signals merely for convenience of the description.

The cross polarization interference compensating device has first and second device input terminals 1 and 3 supplied with the first-polarization and the second-polarization signals and first and second device output terminals 2 and 4 to which the cross polarization interference compensating device delivers first and second decided signals which will later become clear. Throughout the description, the first-polarization signal is assumed to be a vertically polarized signal and is so labelled. The second-polarization signal is assumed as a horizontally polarized signal and is so labelled.

In the manner described above, the first analog baseband signal is supplied to the terminal 1 and sampled and quantized by a first A/D converter 11. The second analog baseband signal is delivered to the terminal 3 and sampled and quantized by a second A/D converter 12.

Produced by the first A/D converter 11, a first digital signal is the first symbol sequence on which a first intersymbol interference component and a first cross polarization interference component are superposed from the first-polarization signal and the second-polarization signal. The signal is herein called a first before processed or equalized and compensated signal. Similarly, the second A/D converter 12 produces a second digital signal which is called a second before equalized and compensated signal.

A first equalizer (EQL1) 51 produces a first reproduced complementary signal related to the first intersymbol interference component and adds the reproduced complementary signal to the before equalized and compensated signal to provide a first equalizer output signal devoid of the first intersymbol interference. The reproduced complementary signal is a polarity inverted signal of a reproduced signal estimative of the first intersymbol interference component, namely, the reproduced signal multiplied by minus one.

A first cross polarization interference canceller (XPIC1) 53 produces another first reproduced complementary signal concerned with the first cross polarization interference component introduced from the second-polarization signal into the first-polarization signal. An adder 27 follows to add the reproduced complementary signal concerned with the first cross polarization interference component to the first equalizer output signal to produce a signal devoid of the cross polarization interference. With the intersymbol and the cross polarization interference components removed from the before equalized and compensated signal, the signal is called a first post equalized and compensated signal. A first decision circuit 21 is supplied with the first post equalized and compensated signal and decides by its values the first symbol sequence to supply the first decided signal to the terminal 2. Operation is carried out on the second-polarization signal like on the first-polarization signal to make a second decision circuit 22 deliver the second decided signal to the terminal 4.

In the conventional cross polarization interference compensating device, linear transversal filters are used in the equalizers 51 and 52 and the cross polarization interference cancellers 53 and 54. The linear transversal filters are supplied with the before equalized and compensated signals. More particularly, use is made, as an original signal of the reproduced signal for the intersymbol interference component or for the cross polarization interference component, of a signal on which the intersymbol and the cross polarization interference components are superposed. As a consequence, the linear transversal filters produce the reproduced signals for the intersymbol and the cross polarization interference components which are different from the intersymbol and the cross polarization interference components included in the before equalized and compensated signals when the interference components are great.

Defects are therefore inevitable in the conventional cross polarization interference compensating device such that the cross polarization interference component is insufficiently removed when either the intersymbol or the cross polarization interference component grows large.

Figure 2:
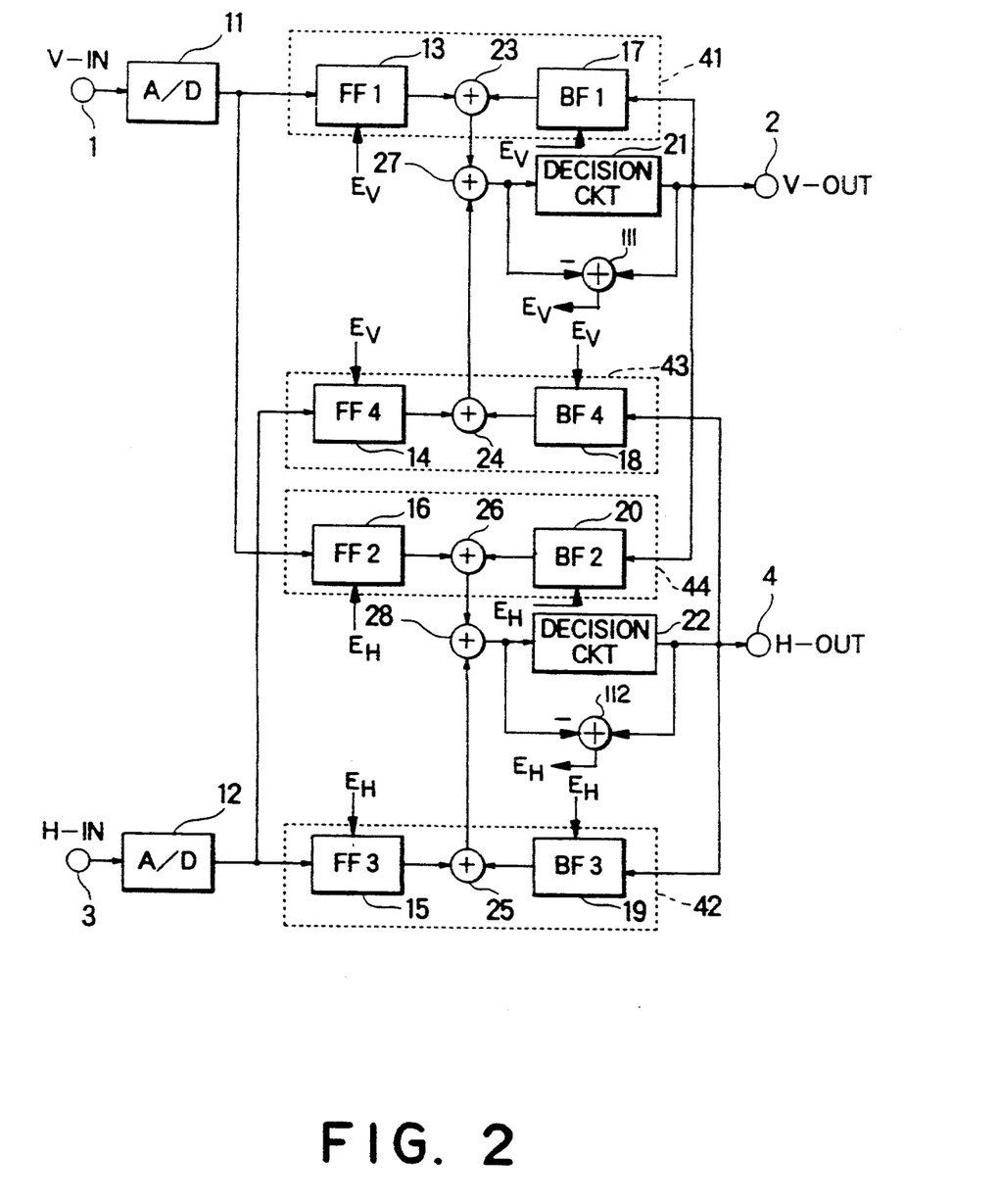
FIG. 2 is a block diagram of a cross polarization interference compensating device according to a first embodiment of the instant invention.

Referring now to FIG. 2, the description will proceed to a cross polarization interference compensating device according to a first embodiment of this invention. Similar parts are designated by like reference numerals.

It should be noted throughout the following description that transversal filters are sometimes referred to simply as filters and that the filters are identical by modifiers first, second, third, and fourth with the modifiers used in an order which will become clear as the description proceeds. This applies to address and delay elements.

In FIG. 2, a part except for a first equalizer 41, a second equalizer 42, a first cross polarization interference canceller 43, and a second cross polarization interference canceller 44 comprises circuits used in the prior art illustrated with reference to FIG. 1 and is similarly operable. Further description will therefore be omitted here.

The first equalizer 41 is supplied with the first before equalized and compensated signal produced by the first A/D converter 11 and furthermore with the first decided signal produced by the first decision circuit 21. Among transversal filters used in the first equalizer 41, a forward tapped portion (a first forward filter (FF1) 13) is supplied with the before equalized and compensated signal. A rearward tapped portion (a first rearward or backward filter (BF1) 17) is fedback with the first decided signal which is produced after removal of the first intersymbol and the first cross polarization interference components. A first adder 23 sums output signals of the first forward filter 13 and the first rearward filter 17 into a first sum signal in which the intersymbol interference component is removed from the before equalized and compensated signal. The first equalizer 41 is called a decision feedback equalizer and described in detail, for example, in "Digital Communications" written by John G. Proakis and published by McGraw-Hill, pages 382 to 386, 6.5 Decision-Feedback Equalization.

The first cross polarization interference canceller 43 is supplied with the second before equalized and compensated signal produced by the second A/D converter 12 and moreover with the second decided signal produced by the second decision circuit 22. Among transversal filters used in the first cross polarization interference canceller 43, a forward tapped portion (a fourth forward filter (FF4) 14) is supplied with the second before equalized and compensated signal. A rearward tapped portion (a fourth rearward filter (BF4) 18) is fedback with the second decided signal which is devoid of the second intersymbol and the second cross polarization interference components. A fourth adder 24 sums output signals of the fourth forward filter 14 and the fourth rearward filter 18 into a reproduced complementary signal related to the first cross polarization interference component which leaks from the second-polarization signal into the first-polarization signal.

A first total adder 27 sums output signals of the first adder 23 and the fourth adder 24 into a first post or after processed or equalized and compensated signal devoid of the first intersymbol and the first cross polarization interference components. Incidentally, the first adder 23 and the fourth adder 24 should concurrently produce their outputs. To this end, the first forward filter 13 and the fourth forward filter 14 should have a substantially common delay time. The first decision circuit 21 judges the post equalized and compensated signal and supplies the terminal 2 with the first decided signal, which is fedback to the first rearward filter 17 of the first equalizer 41 and to the second rearward filter 20 of the second cross polarization interference canceller 44.

Similar operation is carried out on the second-polarization signal. That is, the second decision circuit 22 supplies the terminal 4 with the second decided signal, which is fedback to the fourth rearward filter 18 of the first cross polarization interference canceller 43 and to a third rearward filter 19 of the first equalizer 42. A second forward filter 16 and a third forward filter 15 should have a substantially common delay time like the forward filters 13 and 14.

With the cross polarization interference compensating device illustrated with reference to FIG. 2, it is possible to remove the first and the second cross polarization interference components very effectively as compared with the conventional cross polarization interference compensating device. This is because the rearward filters are not supplied with the before equalized and compensated signals but with the decided signals, each of which is devoid of the intersymbol interference component and the cross polarization interference component. Each cross polarization interference canceller will be called a decision feedback cross polarization interference canceller.

Figure 3:
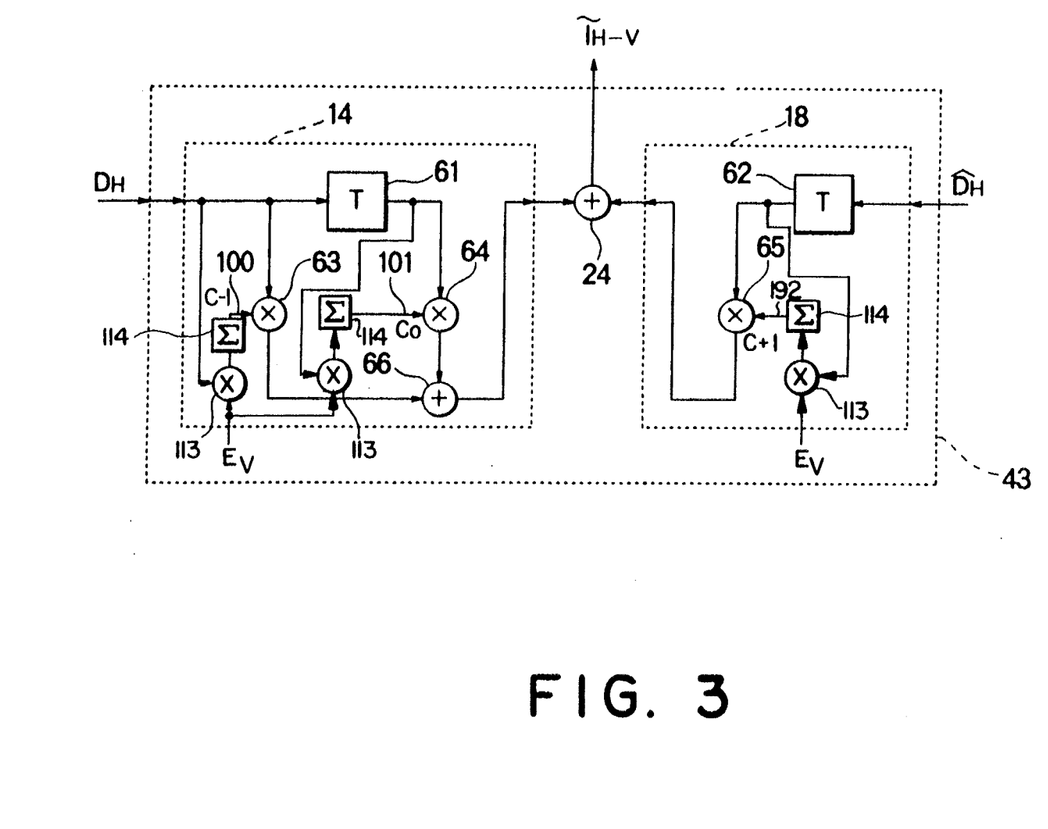
FIG. 3 is a block diagram of a decision-feedback cross polarization interference canceller for use in the cross polarization interference compensating device illustrated in FIG. 2.

Turning to FIG. 3, the first cross polarization interference canceller 43 is depicted as an example of the decision feedback cross polarization interference cancellers. The second digital signal is indicated by $D_H$ and the second decided signal, by $D_H$. The reproduced complementary signal is indicated by $I_{H-V}$. Merely for simplification of the illustration, the forward filter 14 is depicted in the figure as a first-order two-tap transversal filter and the rearward filter 18, as a first-order one-tap transversal filter. It is possible, when the device is used for an orthogonal polarization multilevel modulated signal, to use a second-order transversal filter. Its number of taps is not restricted.

The forward filter 14 comprises a delay element 61 for deciding a time interval, multipliers 63 and 64 for giving weights to the taps, and an adder 66 for summing up tap outputs. Likewise, the rearward filter 18 comprises a delay element 62 and a multiplier 65 for giving a weight to the tap $C_{+1}$. Outputs of the forward filter 14 and the rearward filter 18 are summed by the adder 24 into the reproduced complementary signal for the cross polarization interference component which leaks from the second-polarization signal into the first-polarization signal. Weight signals 100, 101 and 102 for the taps are decided so as to remove from the local polarization post equalized and compensated signal a cross polarization interference component which is nearest to the second-polarization signal.

As an algorithm for automatically deciding each of tap coefficients $C_{-1}$, $C_0$, and $C_{+1}$ represented by the weight signals 100, 101, and 102, it is possible to determine each tap coefficient by, for example, a time average of a correlation factor between a polarity signal of the signal passing through each tap and a polarity of an error signal $E_V$ which is obtained from a subtractor 111 (FIG. 2) by subtracting the decided signal from the post equalized and compensated signal supplied to the decision circuit 21. The correlation factor is obtained by a multiplier 113. The time average is obtained by an average circuit 114. Like algorithms for automatic convergence of the tap coefficients are described in detail, for example, in "Dezitaru Singô Syori (Digital Signal Processing)" published by the Institute of Electronics and Electric Communication, Chapter 11, Table 11.2 (page 241) and will not further be described. In FIG. 2, the forward filter 13 and the backward filter 17 are similar in structure to the forward filter 14 and backward filter 18, respectively. Each of the forward filters 13 and 14 and the rearward filters 17 and 18 is supplied with the error signal $E_V$ so as to remove from an input signal of the decision circuit 21 a cross polarization interference component. Likewise, each of the forward filters 15 and 16 and the rearward filters 19 and 20 is supplied with an error signal $E_H$ so as to remove from an input signal of the decision circuit 22 a cross polarization interference component. The error signal $E_H$ is obtained from a subtracter 112 by subtracting the decided signal from the post equalized and compensated signal supplied to the decision circuit 22.

Figure 4:
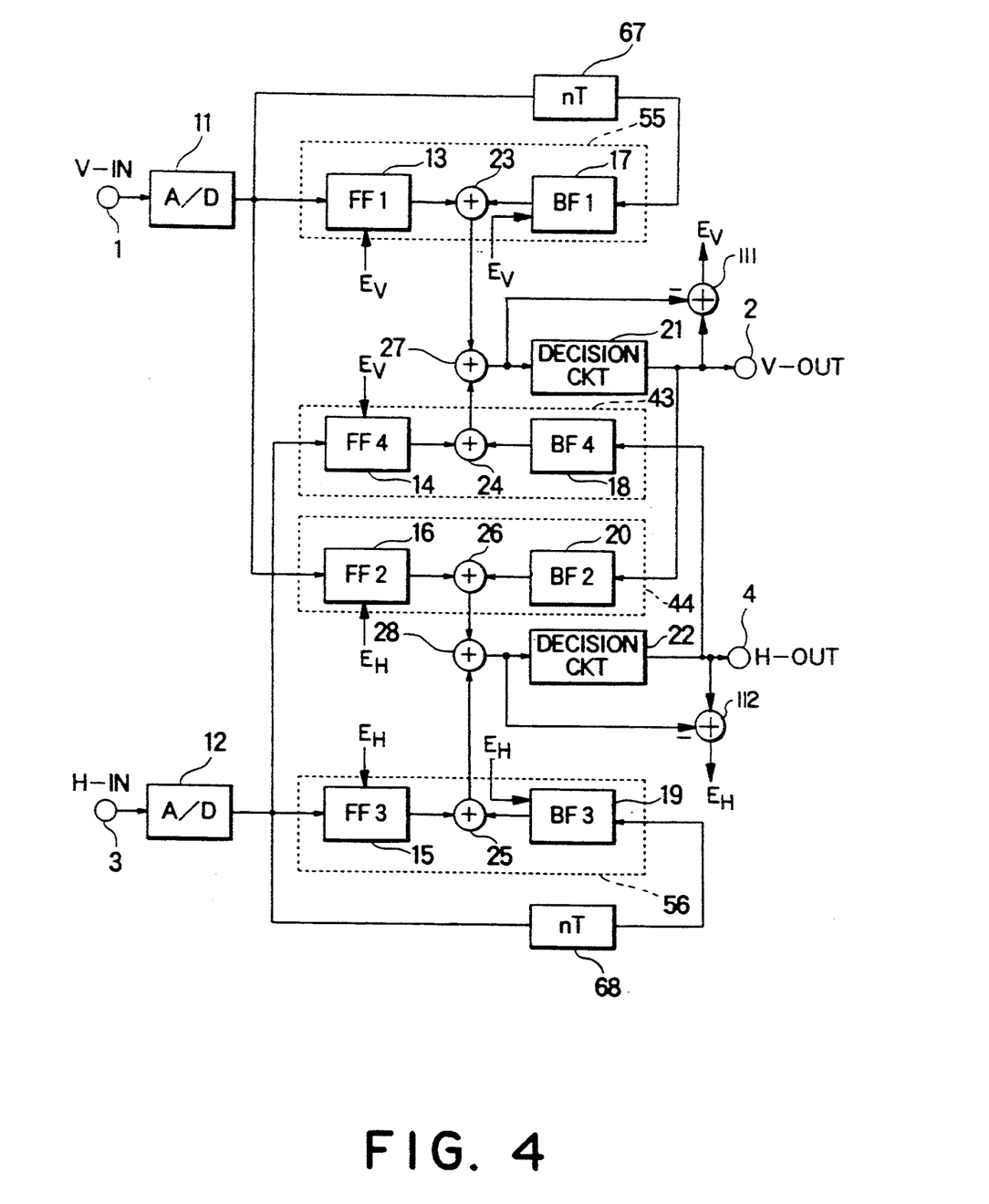
FIG. 4 is a block diagram of a cross polarization interference compensating device according to a second embodiment of this invention.
Figure 5:
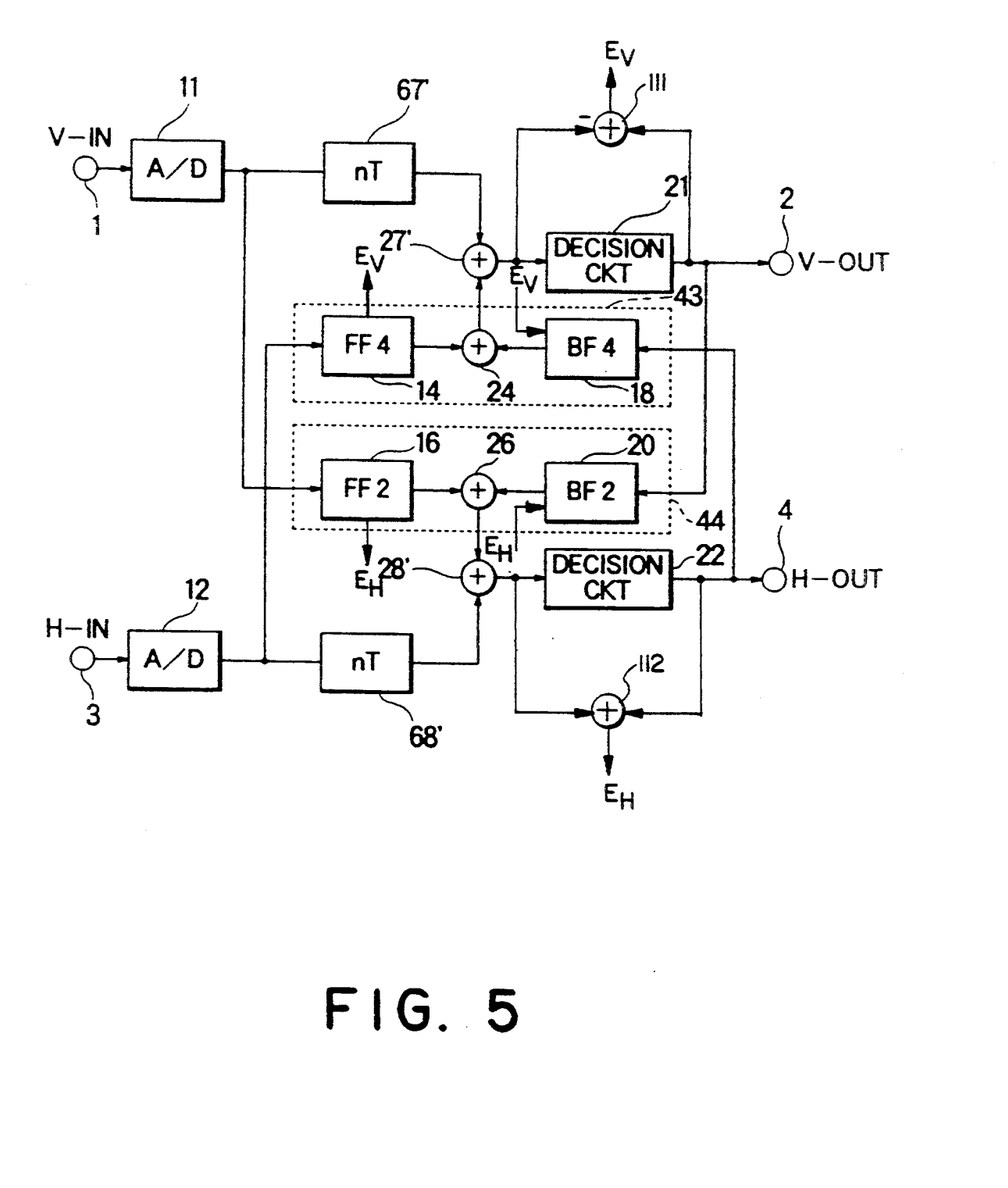
FIG. 5 is a block diagram of a cross polarization interference compensating device according to a third embodiment of this invention.

For a transmission system in which the intersymbol interference is sufficiently smaller than the cross polarization interference, it is possible to provide a cross polarization interference compensating device either by substituting a linear equalizer for each of the decision feedback equalizers 41 and 42 depicted in FIG. 1 or by omitting such equalizers. FIG. 4 is a block diagram of an example of the former. FIG. 5 is a block diagram of an example of the latter.

In FIG. 4, the cross polarization interference compensating device comprises a first delay element 67 having a delay time which is equal to that in the first forward filter 13. The first rearward filter 17 is supplied with the first before equalized and compensated signal to which the delay time is given by the delay element 67. As a result, a first equalizer 55 is implemented by a linear equalizer. Similarly, a second linear equalizer 56 is supplied with the second before equalized and compensated signal and with an output signal of a second delay element 68. Such linear equalizers 55 and 56 are known in the art and will not further be described.

In FIG. 5, use is not made of the linear equalizers 55 and 56 described in conjunction with FIG. 4. Instead, outputs of a third delay element 67' and a fourth delay element 68' are used as inputs of a third total adder 27' and a fourth total adder 28', respectively. It is impossible by the example being illustrated, to remove the intersymbol interference from the before equalized and compensated signal. This cross polarization interference compensating device is nevertheless well operable in a transmission system susceptible to the cross polarization interference alone.

In the manner thus far described, the rearward filter 17, 18, 19, or 20 is supplied in the cross polarization interference compensating device according to this invention in principle with the decided signal which is devoid of the intersymbol interference component and the cross polarization interference component. The reproduced complementary signal for the cross polarization interference component is therefore more reliable than that used in the prior art. As a consequence, use of the cross polarization interference compensating device of this invention provides merits such that the cross polarization interference component is reduced in the post equalized and compensated signal and that the decision circuit scarcely misjudges.

What is claimed is:

1. A cross polarization interference compensating device for use in orthogonal polarization communication system in which a first-polarization signal and a second-polarization signal are used as two orthogonally polarized signals of a common frequency, said cross polarization interference compensating device including a first sampling and quantizing unit for sampling and quantizing said first-polarization signal into a first digital signal, a second sampling and quantizing unit for sampling and quantizing said second-polarization signal into a second digital signal, a first decision circuit for deciding a first-polarization symbol sequence in a first circuit input signal as a first decided signal, and a second decision circuit for deciding a second-polarization symbol sequence in a second circuit input signal as a second decided signal, said cross polarization interference compensating device comprising:

first and second forward transversal filters supplied with said first digital signal;

third and fourth forward transversal filters supplied with said second digital signal;

first and second rearward transversal filters supplied with said first decided signal;

third and fourth rearward transversal filters supplied with said second decided signal;

a first total adder for summing output signals of said first forward transversal filter, said first rearward transversal filter, said fourth forward transversal filter, and said fourth rearward transversal filter into said first circuit input signal;

a second total adder for summing output signals of said second forward transversal filter, said second rearward transversal filter, said third forward transversal filter, and said third rearward transversal filter into said second circuit input signal;

a first subtracter for subtracting said first decided signal from said first circuit input signal to produce a first error signal; and a second subtracter for subtracting said second decided signal from said second circuit input signal to produce a second error signal;

each of said first forward transversal filter, said first rearward transversal filter, said fourth forward transversal filter, and said fourth rearward transversal filter being supplied with said first error signal so as to remove from said first circuit input signal a cross polarization interference component;

each of said second forward transversal filter, said second rearward transversal filter, said third forward transversal filter, and said third rearward transversal filter being supplied with said second error signal so as to remove from said second circuit input signal another cross polarization interference component.

2. A cross polarization interference compensating device for use in an orthogonal polarization communication system in which a first-polarization signal and a second-polarization signal are used as two orthogonally polarized signals of a common frequency, said cross polarization interference compensating device including a first sampling and quantizing unit for sampling and quantizing said first-polarization signal into a first digital signal, a second sampling and quantizing unit for sampling and quantizing said second-polarization signal into a second digital signal, a first decision circuit for deciding a first-polarization symbol sequence in a first circuit input signal as a first decided signal, and a second decision circuit for deciding a second-polarization symbol sequence in a second circuit input signal as a second decided signal, said cross polarization interference compensating device comprising:

a first delay element for giving a first predetermined delay time to said first digital signal to produce a first delayed signal;

a second delay element for giving a second predetermined delay time to said second digital signal to produce a second delayed signal;

first and second forward transversal filters supplied with said first digital signal;

third and fourth forward transversal filters supplied with said second delayed signal;

a first rearward transversal filter supplied with said first delayed signal;

a second rearward transversal filter supplied with said first decided signal;

a third rearward transversal filter supplied with said second delayed signal;

a fourth rearward transversal filter supplied with said second decided signal;

a first total adder for summing output signals of said first forward transversal filter, said first rearward transversal filter, said fourth forward transversal filter into said first circuit input signal;

a second total adder for summing output signals of said second forward transversal filter, said second rearward transversal filter, said third forward transversal filter, and said third rearward transversal filter into said second input signal;

a first subtracter for subtracting said first decided signal from said first circuit input signal to produce a first error signal; and a second subtracter for subtracting said second decided signal from said second circuit input signal to produce a second error signal, each of said first forward transversal filter, said first rearward transversal filter, said fourth forward transversal filter, and said fourth rearward transversal filter being supplied with said first error signal so as to remove from said first circuit input signal a cross polarization interference component;

each of said second forward transversal filter, said second rearward transversal filter, said third forward transversal filter, and said third rearward transversal filter being supplied with said second error signal so as to remove from said second circuit input signal another cross polarization interference component.

3. A cross polarization interference compensating device for use in an orthogonal polarization communication system in which a first polarization signal and a second polarization signal are used as two orthogonally polarized signals of a common frequency, said cross polarization interference compensating device including a first sampling and quantizing unit for sampling and quantizing said first-polarization signal into a first digital signal, a second sampling and quantizing unit for sampling and quantizing said second-polarization signal into a second digital signal, a first decision circuit for deciding a first-polarization symbol sequence in a first circuit input signal as a first decided signal, and a second decision circuit for deciding a second-polarization symbol sequence in a second circuit input signal as a second decided signal, said cross polarization interference compensating device comprising:

a first forward transversal filter supplied with said first digital signal;

a second forward transversal filter supplied with said second digital signal;

a first rearward transversal filter supplied with said first decided signal;

a second rearward transversal filter supplied with said second decided signal;

a first delay element supplied with said first digital signal to produce a first delayed signal with a first predetermined delay time;

a second delay element supplied with said second digital signal to produce a second delayed signal with a second predetermined delay time;

a first total adder for summing output signals of said second forward transversal filter, said second rearward transversal filter, and said first delay element into said first circuit input signal;

a second total adder for summing output signals of said first forward transversal filter, said first rearward transversal filter, and said second delay element into said second circuit input signal;

a first subtracter for subtracting said first decided signal from said first circuit input signal to produce a first error signal; and a second subtracter for subtracting said second decided signal from said second circuit input signal to produce a second error signal;

each of said second forward transversal filter and said second rearward transversal filter being supplied with said first error signal so as to remove from said first circuit input signal a cross polarization interference component;

each of said first forward transversal filters, and said first rearward transversal filter being supplied with said second error signal so as to remove from said second circuit input signal another cross polarization interference component.

* * * * *

UNITED STATES PATENT AND TRADEMARK OFFICE
CERTIFICATE OF CORRECTION

PATENT NO.   : 5,432,522
DATED        : July 11, 1995
INVENTOR(S)  : Yuzo KUROKAMI It is certified that error(s) appears in the above-identified patent and that said Letters Patent is hereby corrected as shown below:

Col. 1, line 33, delete "⇌", and insert --"--.

Col. 6, line 62, delete "$D_H$" and insert --$\hat{D}_H$--.

Col. 6, line 63, delete "$I_{H-V}$" and insert --$\tilde{I}_{H-V}$--.

Signed and Sealed this

Sixteenth Day of January, 1996

BRUCE LEHMAN

*Attest:*

*Attesting Officer*          *Commissioner of Patents and Trademarks*